United States Patent
Huang et al.

(10) Patent No.: US 10,283,069 B2
(45) Date of Patent: May 7, 2019

(54) DISPLAY PANEL

(71) Applicant: Novatek Microelectronics Corp., Hsinchu (TW)

(72) Inventors: Ju-Lin Huang, Hsinchu County (TW); Jhih-Siou Cheng, New Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/954,609

(22) Filed: Apr. 17, 2018

(65) Prior Publication Data

US 2018/0233102 A1    Aug. 16, 2018

Related U.S. Application Data

(63) Continuation of application No. 15/152,575, filed on May 12, 2016, now Pat. No. 9,972,271.

(51) Int. Cl.
*G09G 3/36* (2006.01)
*G02F 1/1362* (2006.01)

(52) U.S. Cl.
CPC ..... *G09G 3/3685* (2013.01); *G02F 1/136286* (2013.01); *G09G 3/3648* (2013.01); *G09G 3/3677* (2013.01); *G09G 2300/0426* (2013.01); *G09G 2320/02* (2013.01); *G09G 2320/0223* (2013.01)

(58) Field of Classification Search
CPC .............. G02F 1/13; G09G 2300/0426; G09G 2320/02; G09G 2320/0223; G09G 3/3648; G09G 3/3677; G09G 3/3685
See application file for complete search history.

(56) References Cited

U.S. PATENT DOCUMENTS

| | | | | |
|---|---|---|---|---|
| 6,072,474 A * | 6/2000 | Morimura | ............. | G06F 3/0488 345/173 |
| 6,154,196 A * | 11/2000 | Fleck | ............. | G06F 3/03543 345/156 |
| 6,473,072 B1 * | 10/2002 | Comiskey | ............. | B41J 3/4076 345/107 |
| 6,791,569 B1 * | 9/2004 | Millet | ............. | G06T 11/203 345/581 |
| 6,798,378 B1 * | 9/2004 | Walters | ............. | G01O 5/00 342/357.57 |
| 7,006,082 B2 * | 2/2006 | Akai | ............. | G09G 3/3659 345/204 |
| 9,494,831 B2 * | 11/2016 | Chiu | ............. | G02F 1/1362 |
| 9,978,880 B2 * | 5/2018 | Chang | ............. | G02F 1/136277 |
| 2001/0050667 A1 * | 12/2001 | Kim | ............. | G02B 6/001 345/102 |

(Continued)

*Primary Examiner* — Tony O Davis
(74) *Attorney, Agent, or Firm* — JCIPRNET

(57) ABSTRACT

A display panel including a plurality of pixel units, a plurality of source lines, a plurality of gate lines and a plurality of common electrode lines is provided. The pixels units are arranged in array. The array includes a plurality of columns and a plurality of rows. The source lines are respectively coupled with the pixel units disposed in a same column of the columns. The gate lines are respectively coupled with the pixel units disposed in a same row of the rows. The common electrode lines and gate lines extend parallelly with each other. At least one of the source date lines, the gate lines and the common electrode lines has the line widths varied along the extension direction thereof.

14 Claims, 12 Drawing Sheets

(56) References Cited

U.S. PATENT DOCUMENTS

| | | | | |
|---|---|---|---|---|
| 2003/0151597 A1* | 8/2003 | Roberts | ............... | G09B 21/004 |
| | | | | 345/173 |
| 2003/0214490 A1* | 11/2003 | Cool | ................. | G06F 3/03545 |
| | | | | 345/179 |
| 2004/0044514 A1* | 3/2004 | Granny | ............... | G06F 17/5027 |
| | | | | 703/23 |
| 2005/0035718 A1* | 2/2005 | Lee | ...................... | G09G 3/3233 |
| | | | | 315/164 |
| 2006/0052498 A1* | 3/2006 | Watanabe | ............ | G03F 7/0226 |
| | | | | 524/261 |
| 2008/0180410 A1* | 7/2008 | McCall | ................ | G06T 11/203 |
| | | | | 345/179 |
| 2010/0053058 A1* | 3/2010 | Nagashima | ............... | G09G 3/36 |
| | | | | 345/98 |
| 2010/0253897 A1* | 10/2010 | Ohgami | ............ | G02F 1/134309 |
| | | | | 349/142 |
| 2012/0016971 A1* | 1/2012 | Wakai | ................ | G06F 13/4022 |
| | | | | 709/220 |
| 2012/0099060 A1* | 4/2012 | Matsumoto | ....... | G02F 1/133371 |
| | | | | 349/106 |
| 2015/0293412 A1* | 10/2015 | Chiu | ..................... | G02F 1/1362 |
| | | | | 349/122 |
| 2017/0061895 A1* | 3/2017 | Paolini, Jr. | ............. | G09G 3/344 |
| 2017/0082922 A1* | 3/2017 | Kang | ................ | G03F 7/0007 |
| 2017/0090604 A1* | 3/2017 | Barbier | .............. | G06F 3/03545 |
| 2017/0097727 A1* | 4/2017 | Wu | ....................... | G06F 3/0412 |
| 2017/0373397 A1* | 12/2017 | Yashiro | ................... | H01Q 1/38 |
| 2018/0284972 A1* | 10/2018 | Akagawa | ............ | G06F 3/04842 |

\* cited by examiner

DISPLAY PANEL

CROSS-REFERENCE TO RELATED APPLICATION

This application is a continuation application of and claims the priority benefit of a prior application Ser. No. 15/152,575, filed on May 12, 2016, now allowed. The entirety of the above-mentioned patent application is hereby incorporated by reference herein and made a part of this specification.

BACKGROUND OF THE INVENTION

Field of the Invention

The invention relates to a display panel technology, and more particularly, to a display panel with the metal lines having different line widths.

Description of Related Art

With the advance in display technology, the liquid crystal display (LCD) device has been greatly utilized in the consumer electronic devices such as the notebook, personal computer and TV. Moreover, people nowadays have higher requirements in the display quality, and thereby the LCD devices with higher pixel density and larger screen size are constantly introduced to the market.

In the tendency of the LCD panel having larger size, the time constant of the metal lines on the display panel far away from the source and gate driving chips are greater than the time constant of the metal lines close to the source and gate driving chips. FIG. 1 is a schematic diagram of a conventional display panel 50. As the display panel 50 shown in FIG. 1, the pixel units have different distances toward a source driving chip SD and a gate driving chip GD. Moreover, each of the pixel units has the same configuration of a source line 51 for transmitting source driving signals, a gate line 52 for transmitting gate driving signals and a common electrode line 53 for providing a reference voltage, and thus the same equivalent circuit. FIG. 2 illustrates a simplified equivalent circuit schematic of the conventional display panel 50 of FIG. 1, including the equivalent resistances of a metal line (e.g., source line/gate line/common electrode line) and parasitic capacitances between metal lines. In FIG. 2, $R_L$ is the equivalent resistance of a portion of the metal line and $C_L$ is the parasitic capacitance between different metal lines such as between the source line 51 and gate line 52 or between the source line 51 and the common electrode line 53, with respect to the portion. Some equivalent resistances and parasitic capacitances in the panel are ignored in FIG. 2 since they are relatively small.

In FIG. 2, the point A represents the location of the pixel unit P1 of FIG. 1, which is closer to the source driving chips SD or gate driving chips GD, and the point B represents the location of the pixel unit P2 of FIG. 1, which is far away from the source driving chips SD or gate driving chips GD. Take a source line or a gate line consisting of 5 equal portions as an example, through an approximate calculation, it can be known that the charging and discharging time constant of the point A of FIG. 2 is $R_L*C_L$, and the charging and discharging time constant of the point B is $15R_L*C_L$ which is equivalent to $R_L*C_L+2R_L*C_L+3R_L*C_L+4R_L*C_L+5R_L*C_L$. The farther the location of a pixel unit (e.g., at point B) is from the source/gate driving chip, the longer charging/discharging time the pixel unit requires due to the time constant resulted from the metal lines. Thus, pixel units far from the source and gate driving chips may have insufficient charging/discharging time, such that the display panel cannot display data in a regular picture quality.

The conventional solution toward the above-mentioned problems relies on modifying the manufacturing process through replacing the materials of metal lines from the conventional aluminum wires to the copper wires. Alternatively, the driving method of the source and gate driving chips is changed from merely one side to two sides. However, the above-mentioned problems still exist when the size of the display panel is getting larger even though the conventional solutions are applied.

SUMMARY OF THE INVENTION

The invention provides a display panel, which has the metal lines with different line widths at the different locations of the display panel, so as to minimize the difference of the charging time constant at the different locates of the display panel, so that the display quality of the large size display panel can be enhanced.

A display panel of an embodiment of the invention includes a plurality of pixel units, a plurality of source lines, a plurality of gate lines and a plurality of common electrode lines. The pixel units are disposed as an array, and the array includes a plurality of columns and a plurality of rows. Each of the source lines is coupled to the pixel units disposed in a same column of the columns. Each of the gate lines is coupled to the pixel units disposed in a same row of the rows. The common electrode lines parallelly extend with the gate lines, wherein at least one of the source lines, the gate lines and the common electrode lines has the line widths varied along the extension direction thereof.

According to an embodiment of the present invention, the line widths of the source line are gradually reduced from an end portion of the source line close to a source driving chip toward the other end portion of the source line.

According to an embodiment of the present invention, at least one of the source lines comprises a plurality of portions, among which a first portion having a larger line width is closer to a source driving chip and a second portion having a smaller line width is farther from the source driving chip.

According to an embodiment of the present invention, the line widths of the gate line are gradually reduced from an end portion of the gate line close to a gate driving chip toward the other end portion of the gate line.

According to an embodiment of the present invention, at least one of the gate lines comprises a plurality of portions, among which a first portion having a larger line width is closer to a gate driving chip and a second portion having a smaller line width is farther from the gate driving chip.

According to an embodiment of the present invention, the at least one of the source lines having different line widths comprises a plurality of portions, and one of the portions comprises a non-intersecting part and an intersecting part intersecting with a gate line or a common electrode line and having a line width smaller than the non-intersecting part.

According to an embodiment of the present invention, the gate line or the common electrode line intersecting with the source line comprises a first part not intersecting with the source line and a second part intersecting with the intersecting part of the source line, and the line width of the second part is smaller than the line width of the first part.

According to an embodiment of the present invention, at least one of the source lines comprises a plurality of portions, among which a first portion closer to a source driving chip has a smaller distance to the gate lines and a second portion farther from the source driving chip has a larger distance to the gate lines.

A display panel of an embodiment of the invention includes a plurality of pixel units, a plurality of source lines, a plurality of gate lines and a plurality of common electrode lines. The pixel units are disposed as an array, wherein the array comprises a plurality of columns and a plurality of rows. Each of the source lines is coupled to the pixel units disposed in a same column of the columns. Each of the gate lines is coupled to the pixel units disposed in a same row of the rows. The common electrode lines parallelly extend with the gate lines, wherein at least one of the source lines, the gate lines and the common electrode lines has thickness varied along the extension directions thereof.

According to an embodiment of the present invention, the thickness of the source line is gradually increased from an end portion of the source line close to a source driving chip toward the other end portion of the source line.

According to an embodiment of the present invention, at least one of the source lines comprises a plurality of portions, among which a first portion having a smaller thickness is closer to a source driving chip and a second portion having a larger thickness is farther from the source driving chip.

According to an embodiment of the present invention, at least one of the source lines comprises a plurality of portions, among which a first portion closer to a source driving chip has a smaller distance to the gate lines and a second portion farther from the source driving chip has a larger distance to the gate lines.

According to an embodiment of the present invention, the thickness of the gate line or the common electrode line is gradually increased from an end portion of the gate line or the common electrode line close to a gate driving chip toward the other end portion of the gate line.

According to an embodiment of the present invention, at least one of the gate lines comprises a plurality of portions, among which a first portion having a smaller thickness is closer to a gate driving chip and a second portion having a larger thickness is farther from the gate driving chip.

Based on the above, the line widths of the source lines, the gate lines and the common electrode lines in the extension direction thereof are altered, which causes the changes of the load resistance of the source lines, the gate lines and the common electrode lines and the parasitic capacitance generated therebetween. Moreover, through the alteration of the above-mentioned load resistance and the parasitic capacitance, the charging time constant difference in different portions of the source lines, the gate lines or the common electrode lines can be further reduced. Therefore, through minimize the charging time constant difference between the aforementioned different portions of the source lines, gate lines or the common electrode, the display abnormality in display panel caused by insufficient charging can be alleviated.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
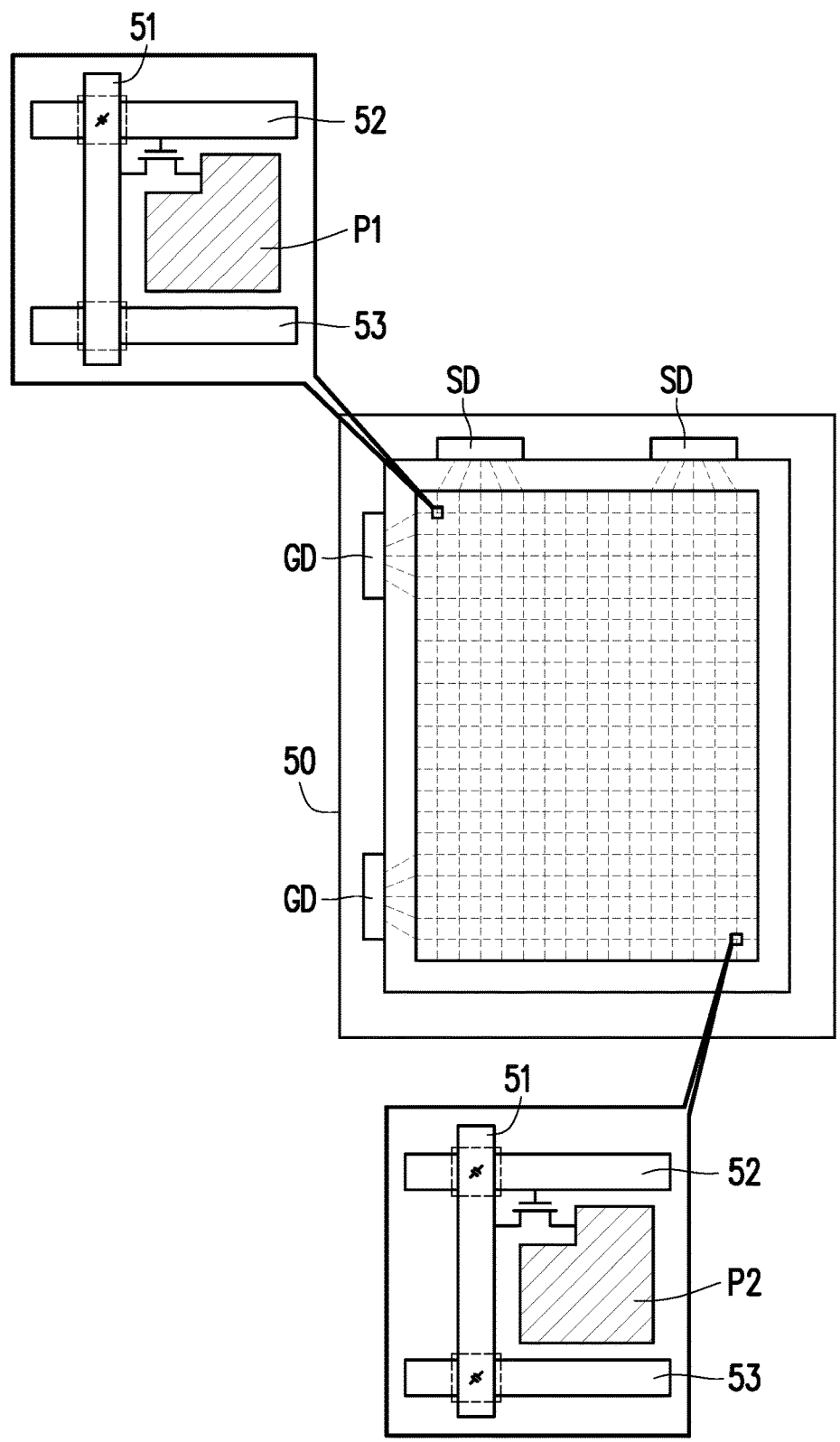
FIG. 1 is a schematic diagram of a conventional display panel.

The term "coupled to (or connected to)" used in the entire text of the specification of the present application (including claims) can refer to any direct or indirect connecting means. For instance, if the text describes a first apparatus is coupled to (or connected to) a second apparatus, then it should be understood that the first apparatus can be directly connected to the second apparatus, or the first apparatus can be indirectly connected to the second apparatus via other apparatuses or certain connecting means. Moreover, when applicable, devices/members/steps having the same reference numerals in figures and embodiments represent the same or similar parts. Devices/members/steps having the same reference numerals or having the same terms in different embodiments can be cross-referenced.

Figure 3:
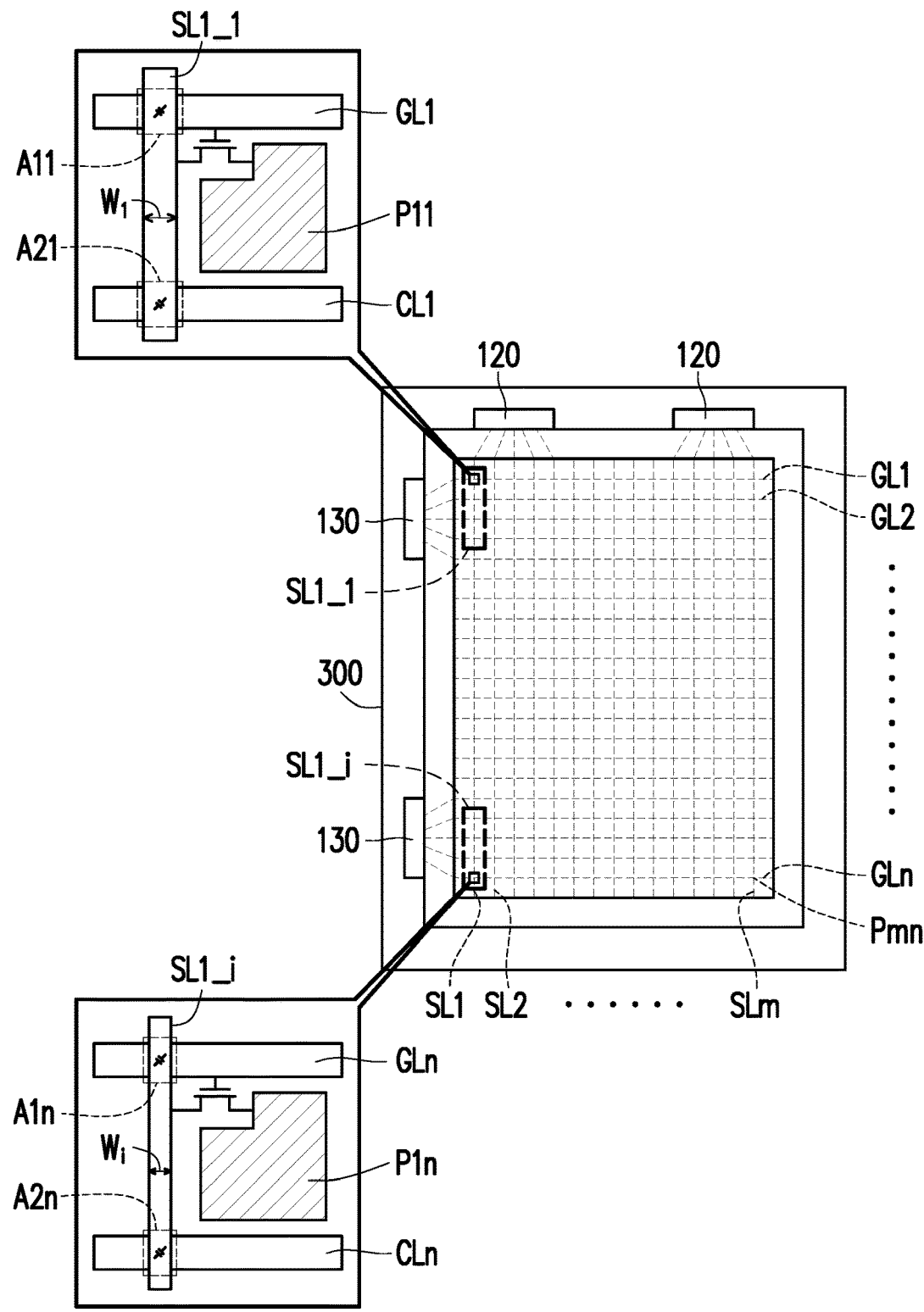
FIG. 3 is a schematic diagram of a display panel according to an embodiment of the invention.
Figure 4:
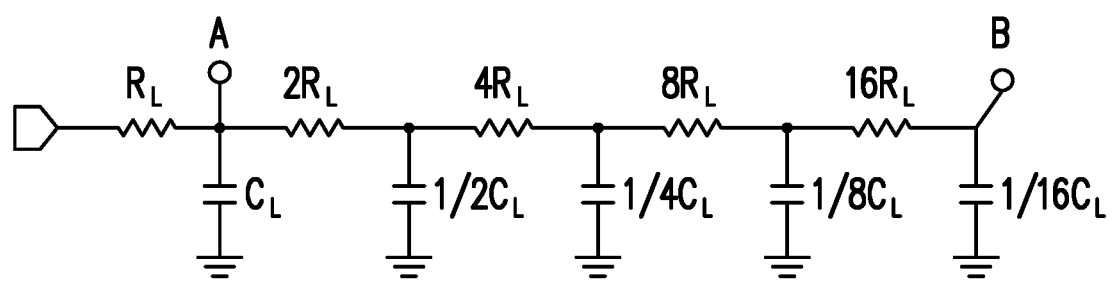
FIG. 4 illustrates an equivalent circuit schematic of the display panel of FIG. 3.

FIG. 3 is a schematic diagram of a display panel 300 according to an embodiment of the invention. FIG. 4 is an equivalent circuit schematic of the display panel 300 of FIG. 3. In the present embodiment, a display panel 300 includes a plurality of pixel units P11-Pnm, and the pixel units P11-Pnm are configured in an array. The array includes in columns and n rows, wherein m and n are positive integers. Moreover, the display panel 300 includes a plurality of source date lines SL1-SLm, a plurality of gate lines GL1-GLn and a plurality of common electrode lines CL1-CLn. In the present embodiment, the source lines SL1-SLm, the gate lines GL1-GLn and the common electrode lines CL1-CLn are disposed surrounding the pixel units P11-Pnm and respectively coupled to the pixel units P11-Pnm located in the same rows or same columns. Source driving signals are transmitted on the source lines SL1-SLm and drive the pixel units via switch transistors (TFT). Gate driving signals are transmitted on the gate lines GL1-GLn to control on/off state of TFTs. A reference voltage is provided through the common electrode lines CL1-CLn. Furthermore, the gate lines GL1-GL and the source lines SL1-SLm are perpendicularly intersected with each other, and the common electrode lines CL1-CLn extends in parallel with the gate lines GL1-GLn. Each of the source lines SL1-SLm or the gate lines GL1-GLn can be taken as comprising a plurality of portions and each portion is corresponding to multiple pixel units. It is worth mentioned that at least one of the source lines SL1-SLm and the gate lines GL1-GLn and the common electrode lines CL1-CLn in the present embodiment have different line widths varied along their extension directions, and as a result, at least one of the source lines SL1-SLm, the gate lines GL1-GLn and the common electrode lines CL1-CLn may have different equivalent resistances by different portions, or even more, each portion inside may have different equivalent resistances. Moreover, in the present embodiment, the source lines SL1-SLm, the gate lines GL1-GLn and the common electrode lines CL1-CLn are the metal lines made of but not limited to the conductive materials such as aluminum or copper.

Specifically, in the present embodiment, the display panel 300 can be configured with a plurality of source driving chips 120 and a plurality of gate driving chips 130. The source driving chips 120 are respectively coupled to the source lines SL1-SLm, and the gate driving chips 130 are respectively coupled to the gate lines GL1-GLn. In the present embodiment as shown in FIG. 3, the source lines SL1 includes i portions from SL1_1 to SL1_i and the line widths of the source lines SL1 may be gradually reduced by i stages, from an end portion SL1_1 close to the source driving chips 120 toward the other end portion SL1_i far from the source driving chips 120, such that different line widths $W_1$-$W_i$ are presented in the source line SL1. The source lines SL2-SLm may have similar configuration regarding to the line width. As shown in FIG. 3, the source line SL1 and the gate line GL1 are intersected to form a first overlapped area A11, and the source line SL1 and the common electrode line CL1 are intersected to form a second overlapped area A21. The portion SL1_1 of the source line SL1 passing through the first overlapped area A11 and the second overlapped area A21 has a line width $W_1$. The source line SL1, the lowermost gate line GLn in FIG. 3 and the common electrode line CLn are respectively intersected to form a first overlapped area A1n and a second overlapped area A2n. The portion SL1_i of the source line SL1 passing through the first overlapped area A1n and the second overlapped area A2n has a line width Wi, wherein the number i is a positive integer increasing along the direction from the source driving chip 120. In other words, the source line includes a first portion (such as SL1_1) having a larger width closer to the source driving chip and a second portion (such as SL1_i) having a smaller width farther from the source driving chip. In the present embodiment, the line width of the source line SL1 is gradually reduced through i different stages. Referring to FIG. 4, the above-mentioned integer i is 5 as an example, that is, the line width of the source line SL1 is gradually reduced through 5 different stages. In each stage, the line width of the source line SL1 is reduced to half of the line width in a preceding stage. The line width of the source line SL1 in the present embodiment can be expressed as following equation:

$$W_{(j+1)}=(1/2)*W_j, j=1, 2, 3 \ldots (i-2), (i-1) \quad \text{Eq(1)}$$

Therefore, in the present embodiment in FIG. 3 and FIG. 4, an far-end portion of the source line SL1 far away from the source driving chip 120 has line width $W_5$ as the fifth stage, and the near-end portion of the source line SL1 close to the source driving chip 120 has the line width $W_1$ as the first stage, wherein $W_5=(1/16)W_1$ based on Eq(1). Take 1000 pixel units (as the number of the gate lines) of a pixel column and 5 different line widths of the source line as an example, in the first stage, pixel units 1-200 of the source line SL1 have the same line width $W_1$; in the second stage, pixel units 201-400 have the same line width $W_2=(1/2)W_1, \ldots$; and, in the fifth stage, the pixel units 801-1000 have the same line width $W_5=(1/16)W_1$. In another embodiment, every stage is not necessarily corresponding to the same number of portions. As the above-mentioned, the portion of the source line SL1 passing through the first overlapped area A1n and the second overlapped area A2n has the line width $W_5$ which is one-sixteenth of the line width $W_1$. Owing to the equivalent resistance of the metal lines being inversely proportional to the lines widths thereof, the equivalent resistance of the portion of the source line SL1 having the line width $W_5$ is sixteen times the equivalent resistance of the portion of the source line SL1 having the line width $W_1$. That is, in the embodiment of FIG. 3 and FIG. 4, the equivalent resistance of a portion of the source line SL1 may be expressed as following equation:

$$R_{(j+1)}=2R_j, j=1, 2, 3 \ldots (i-2), (i-1) \quad \text{Eq(2)}$$

That is, the equivalent resistance of a portion of the source line in a current stage is a double of the equivalent resistance of another portion in a preceding stage. For those lines having widths not reduced by a ratio of 1/2 but another ratio, the equations Eq(1) and Eq(2) may be represented different and can also be derived.

On the other hand, as illustrated in the equivalent circuit diagram of FIG. 3, in the first and second overlapped areas A11, A21, the parasitic capacitance respectively generated between the source line SL1 and the gate line GL1 and between the source line SL1 and the common electrode line CL1. As shown in FIG. 4, $C_L$ indicates the parasitic capacitance between a near-end portion of the source line close to the source driving chip and a number of gate lines and common electrode lines with respect to the near-end portion of the source line, and $(1/16)C_L$ indicates the parasitic capacitance between a far-end portion of the source line far from the source driving chip and a number of gate lines and common electrode lines with respect to the far-end portion of the source line, when taking 5 portions of the source line and 5-stages line widths as an example. The parasitic capacitance is determined by the size of the overlapped areas. Specifically, in the present embodiment of FIG. 4, the portion of the source line SL1 in the first and second overlapped areas A1n, A2n has the line width $W_5=(1/16)W_1$, and $W_1$ is the line width of the portion of the source line SL1 in the first and second overlapped areas A11, A21. Moreover, the gate lines GLn and GL1 have the same line width, and the common electrode lines CLn and CL1 have the same line width. Therefore, the parasitic capacitance between the source line SL1 and the gate line GLn and between the source line SL1 and the common electrode line CLn is altered with the line widths of the source line SL1, wherein the parasitic capacitance is directly proportional to the line widths of the source line SL1 in the overlapped area. Accordingly, the parasitic capacitance generated between the source line SL1 and the gate line GLn and between the source line SL1 and the common electrode CLn is reduced with the decrease of the line widths of the source lines SL1. The parasitic capacitance with respect to the different stage of the line width can be expressed as equations similar to the Eq(1) and are omitted herein.

As shown in the equivalent circuit diagram of FIG. 4, the line width of the above-mentioned source line SL1 is reduced to half of its line width in the preceding stage and sequentially through 5 stages, and thus, the equivalent resistances of the 5 portions of the source line SL1 are from $R_L$ to $16R_L$, based on Eq(2). Furthermore, as the above-mentioned, the parasitic capacitance between the source line SL1 and the gate lines GL1-GLn and between the source line SL1 and the common electrode lines CL1-CLn are reduced proportionally to the line widths of the source line SL1, and thus the parasitic capacitance with respect to the 5 portions of the source line SL1 are from $C_L$ to $(1/16)C_L$. Consequently, in the present embodiment, the time constant of the B point in FIG. 4 can be derived through approximate calculation, and the time constant is equivalent to $8.0625*R_L*C_L$, which is $R_L*C_L+3R_L*(1/2)C_L+7R_L*(1/4)C_L+15R_L*(1/8)C_L+31R_L*(1/16)C_L$.

Figure 2:
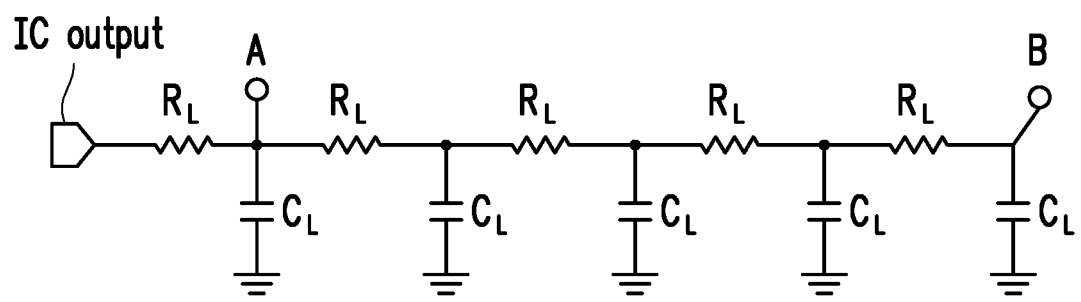
FIG. 2 illustrates a simplified equivalent circuit schematic of the conventional display panel of FIG. 1.

In the present embodiment, through the configuration of the line widths of the source line SL1, the time constant of the point B in FIG. 4 is $8.0625*R_L*C_L$ and this is a significantly reduced value about a half of the time constant of the point B in the conventional display panel 50 illustrated in FIG. 2, which is $15R_L*C_L$. Therefore, in the present embodiment, the time constant difference between the end portion of the source line SL1 close to the source driving chip 120 and the other end portion far away from the source driving chip 120 can be greatly reduced. Therefore, the problems of the poor picture quality caused by insufficient charging at the end portion of the source line SL1 far away from the source driving chip 120 can be alleviated. Besides, in the present embodiment, the line widths of the source line SL1 in the above-mentioned case, which is decreased through 5 stages, is merely taken for explanation. Nevertheless, the ratios or number of the stages of the decrease in the line widths of the source line SL1 in the present invention are not limited to the above-mentioned embodiments. The configuration of the line widths of the source line SL1 can be altered or modulated according to the practical needs.

Furthermore, the above-mentioned source line SL1 is merely taken as an instance for explanation in the present embodiment. In another embodiment not illustrated in the drawings, the line widths of the rest source lines SL2-SLm, the gate lines GL1-GLn and the common electrode lines CL1-CLn may be also configured in a fashion identical or similar to the configuration of the line widths of the above-mentioned source line SL1, and thereby the RC time constants at the portion of the source line far from the source driving chip can be reduced, so as to minimize the difference of time constants at the different portions of the source line.

Figure 5:
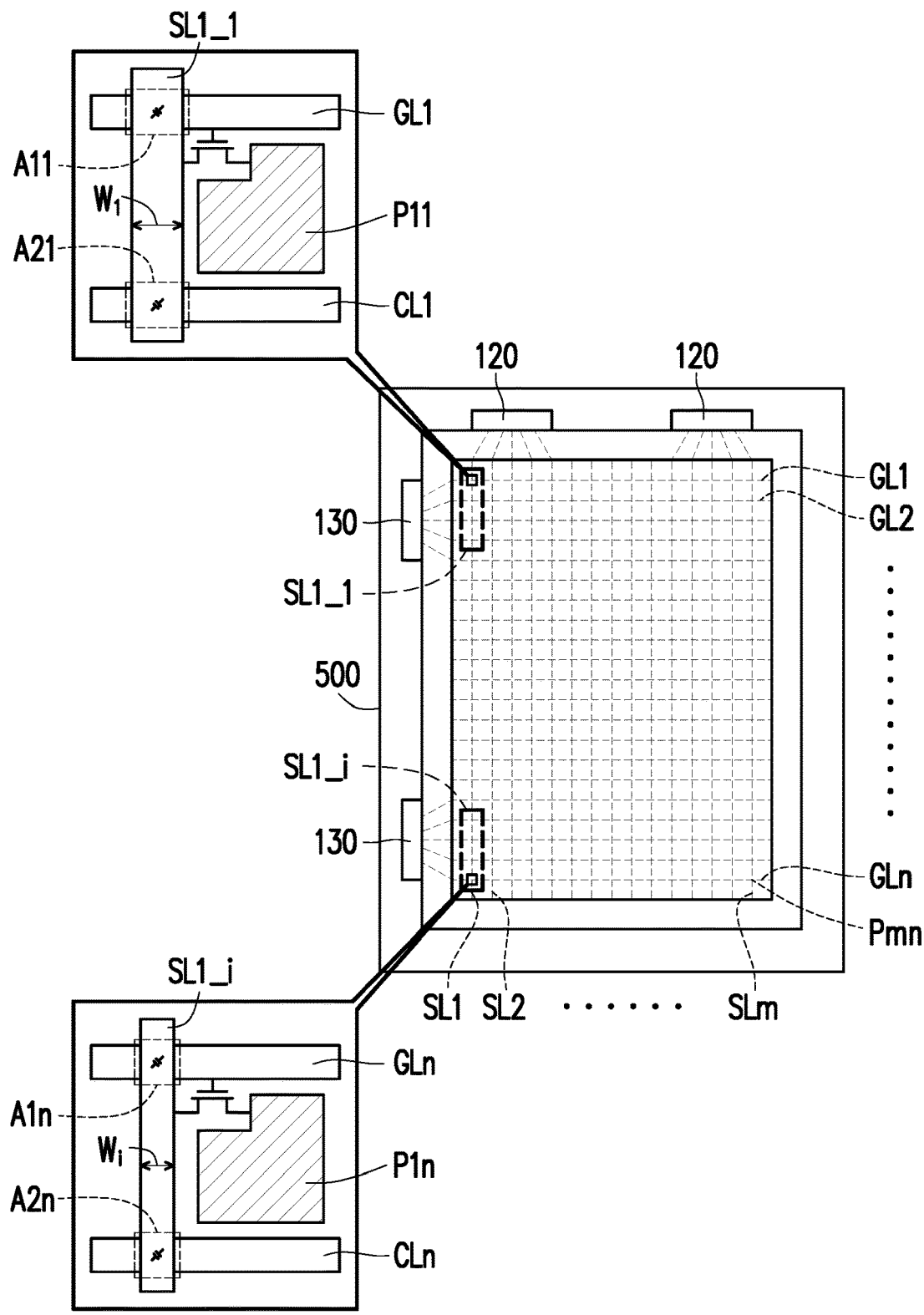
FIG. 5 is a schematic diagram of a display panel according to another embodiment of the present invention.
Figure 6:
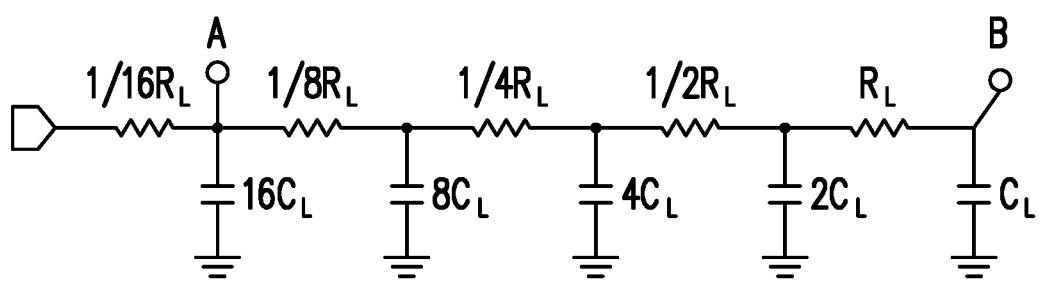
FIG. 6 illustrates the equivalent circuit schematic of the display panel of FIG. 5.

FIG. 5 is a schematic diagram of a display panel 500 according to another embodiment of the present invention. FIG. 6 illustrates the equivalent circuit schematic of the display panel 500 of FIG. 5. The embodiment of FIG. 5 and FIG. 6 is similar to the embodiment of FIG. 3 and FIG. 4. Therefore, identical or similar elements are denoted by the same or similar reference numerals, which will not be described again hereinafter. In the present embodiment, the line widths of the source line SL1 gradually reduced through multiple stages from the end portion SL1_1 of the source line SL1 close to the source driving chip 120 toward the other end portion SL1_i of the source line SL1 far from the source driving chip 120, similar to the illustrated in FIG. 3. In a different perspective, the line widths of the source line SL1 may be regarded as being increased double in the sequential stage from the end portion SL1_i of the source line SL1 far away from the source driving chip 120 toward the end portion SL1_1 close to the source driving chip 120 through multi stages. As illustrated in equivalent circuit diagram of FIG. 6 which takes 5-stages line widths as an example, the equivalent resistance of the source line SL1 is reduced from the point B in FIG. 6 (i.e., the pixel unit P1n in FIG. 5) toward the direction of the point A (i.e., the pixel unit P11 in FIG. 5) along with the increase of the line widths of the source line SL1 in different stages. By contrast, the parasitic capacitance between the source line SL1 and the gate lines GL1-GLn and between the source line SL1 and the common electrode lines CL1-CLn are increased proportionally to the increase of the line widths of the source line SL1. In the present embodiment, from the near-end portion of the source line SL1 to the far-end portion of the source line SL1, the equivalent resistances are from $(1/16)R_L$ to $R_L$ and the parasitic capacitances are from $16C_L$ to $C_L$.

Through the above-mentioned configuration of the line widths in the present embodiment, the end portion of the source line SL1 far way from the source driving chip 120 has the same time constant as $(1/16)R_L*16C_L+(3/16)R_L*8C_L+(7/16)R_L*4C_L+(15/16)R_L*2C_L+(31/16)R_L*C_L$, namely $8.0625*R_L*C_L$, which is the same as the time constant with respect to the far-end portion in the above-mentioned embodiment of FIG. 3 and FIG. 4. In other words, compared to the conventional configuration of the line widths, the time constant of the end portion of the source line SL1 far away from the source driving chip 120 can be reduced about half of the time constant of the point B in the conventional display panel 50 illustrated in FIG. 2, which is $15R_L*C_L$.

In the above-mentioned embodiment in FIG. 5 and FIG. 6, the configuration of the line widths of the source line SL1 is merely taken as an example for explanation. In another embodiment not illustrated in the drawings, the configurations of the line widths of the rest source lines SL2-SLm, the gate lines GL1-GLn and the common electrode lines CL1-CLn may be also configured through a fashion identical or similar to the aforementioned source line SL1, so as to achieve the same effect of reducing the charging time constant at the location far from the source driving chip as the above-mentioned and minimizing the difference of time constants at the different portions of the source line. Please note that FIG. 3 and FIG. 5 are different perspectives (i.e., reducing the far-end portion, or enlarging the near-end portion) with respect to the line width of the source line, and they are substantially the same. Designers can allocate the source lines with gradually reduced widths, if the end portion most close to the source driving chip is taken as a reference point; or, allocate the source lines with gradually increasing widths, if the end portion most far from the source driving chip is taken as a reference point.

Figure 7:
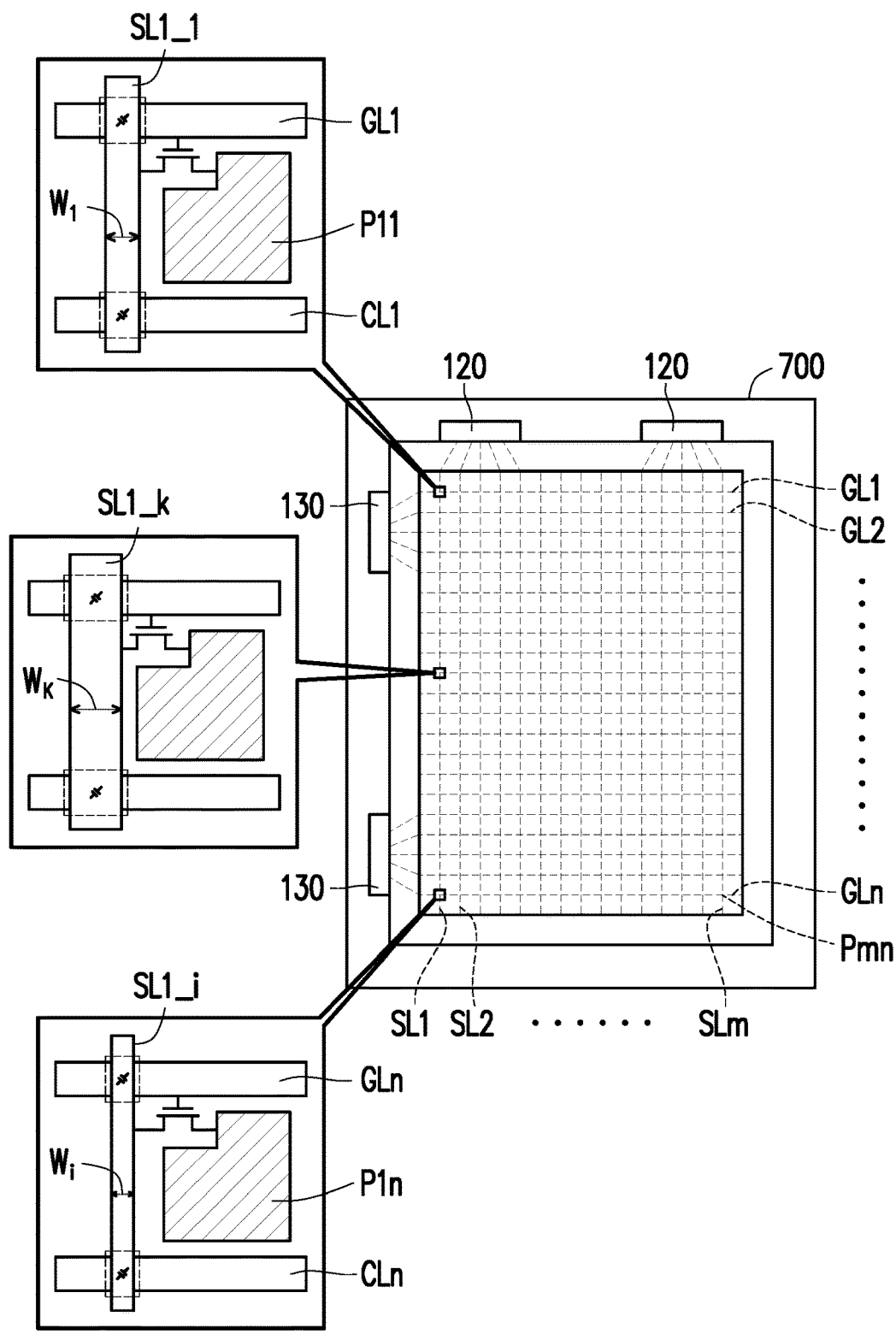
FIG. 7 is a schematic diagram of a display panel according to another embodiment of the present invention.

FIG. 7 is a schematic diagram of a display panel 700 according to another embodiment of the present invention. In the present embodiment, the embodiment of FIG. 7 is similar to the embodiment of FIG. 3. Therefore, identical or similar elements are denoted by the same or similar reference numerals, which will not be described again hereinafter. In the present embodiment, the majority of portions of the source line SL1 follow the tendency of gradually reduced widths (from the source driving chip) or gradually increasing widths (toward the source driving chip), and a few portions do not follow the tendency. As shown in FIG. 7, a line width $W_k$ of an intermediate portion is not smaller but larger than a preceding portion having a line width $W_{k-1}$ (not shown). In the present embodiment, RC time constants with respect to the portions of the source line far from the source driving chip can be reduced too, as long as the portions which do not follow the tendency of width variation are not many.

Figure 8:
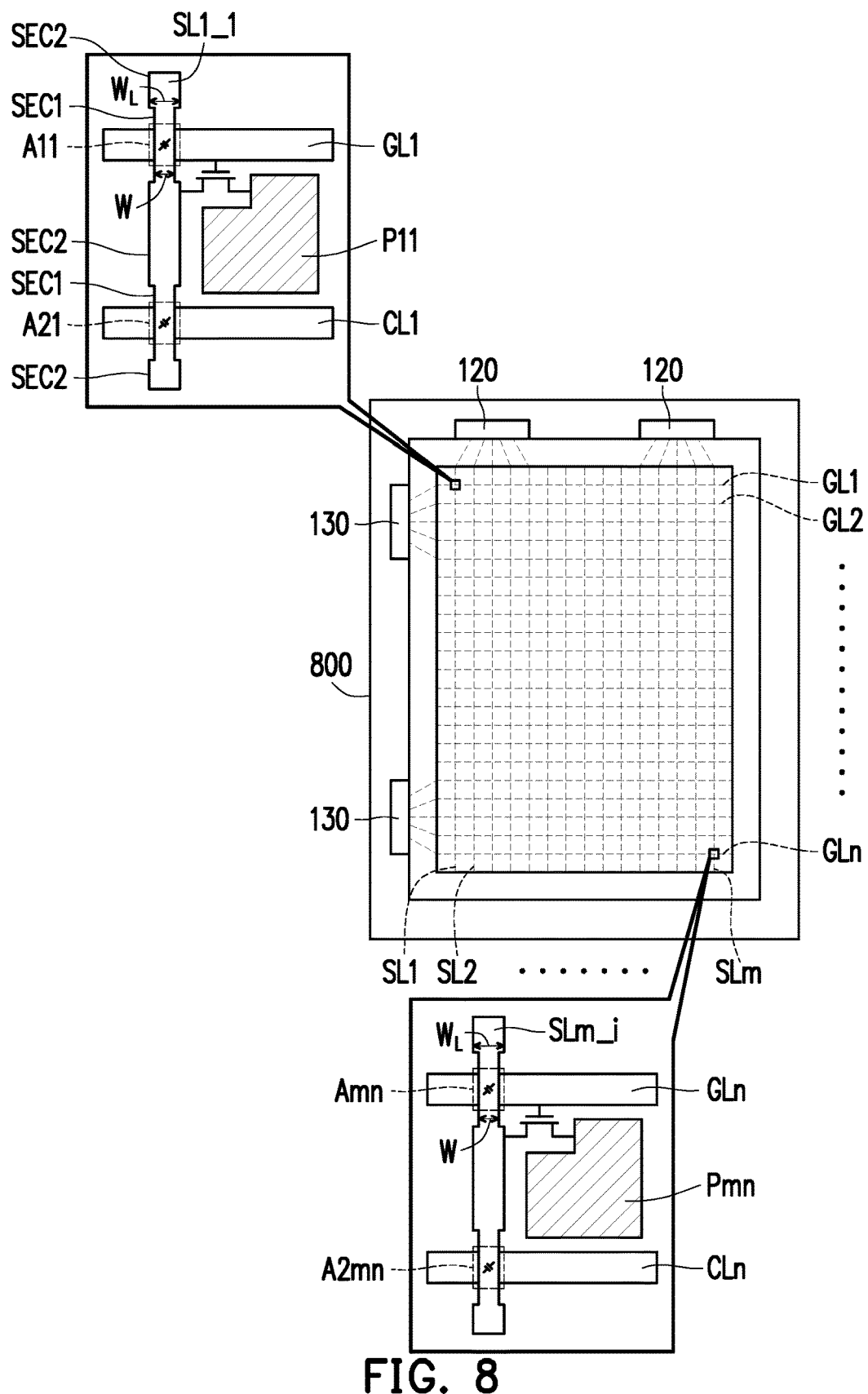
FIG. 8 is a schematic diagram of a display panel according to another embodiment of the present invention.

FIG. 8 is a schematic diagram of a display panel 800 according to another embodiment of the present invention. The embodiment of FIG. 8 is similar to the embodiment of FIG. 3. Therefore, identical or similar elements are denoted by the same or similar reference numerals, which will not be described again hereinafter. In the present embodiment, a portion of the source line SL1 includes an intersecting part SEC1 which includes the overlapped areas that the source line SL1 intersects with the gate line GL1 (such as A11) and intersects with the common electrode line CL1 (such as A21), and also includes a non-intersecting part SEC2 which are areas other than the intersecting part SEC1. Other portions of the source line SL1 or other source lines SL2-SLm may have similar intersecting section and non-intersecting section. The intersecting part SEC1 has a line width W similar to the fixed line width of the source lines in a conventional display panel 50 so that the parasitic capacitance between the source line and the gate line or between the source line and the common electrode line may be the same as the parasitic capacitance in the conventional display panel 50. The non-intersecting part SEC2 has a line width $W_L$ larger than W by increasing the line width of the non-intersecting part SEC2 (to be larger than the fixed width of the source lines in the conventional display panel 50) so as to reduce the equivalent resistance of each portion of the source lines SL1-SLm. Based on the reduced equivalent resistance and the parasitic capacitance which remains the same, the RC time constants can be reduced, compared to a conventional RC time constant. Thus, the difference between the time constants at different portions of the source line is minimized. Note that the area of the intersecting part SEC1 is slightly larger than the overlapped areas as the illustrated FIG. 8, and in another example, the intersecting part SEC1 is approximate to the same size as the overlapped areas is also possible.

Figure 9:
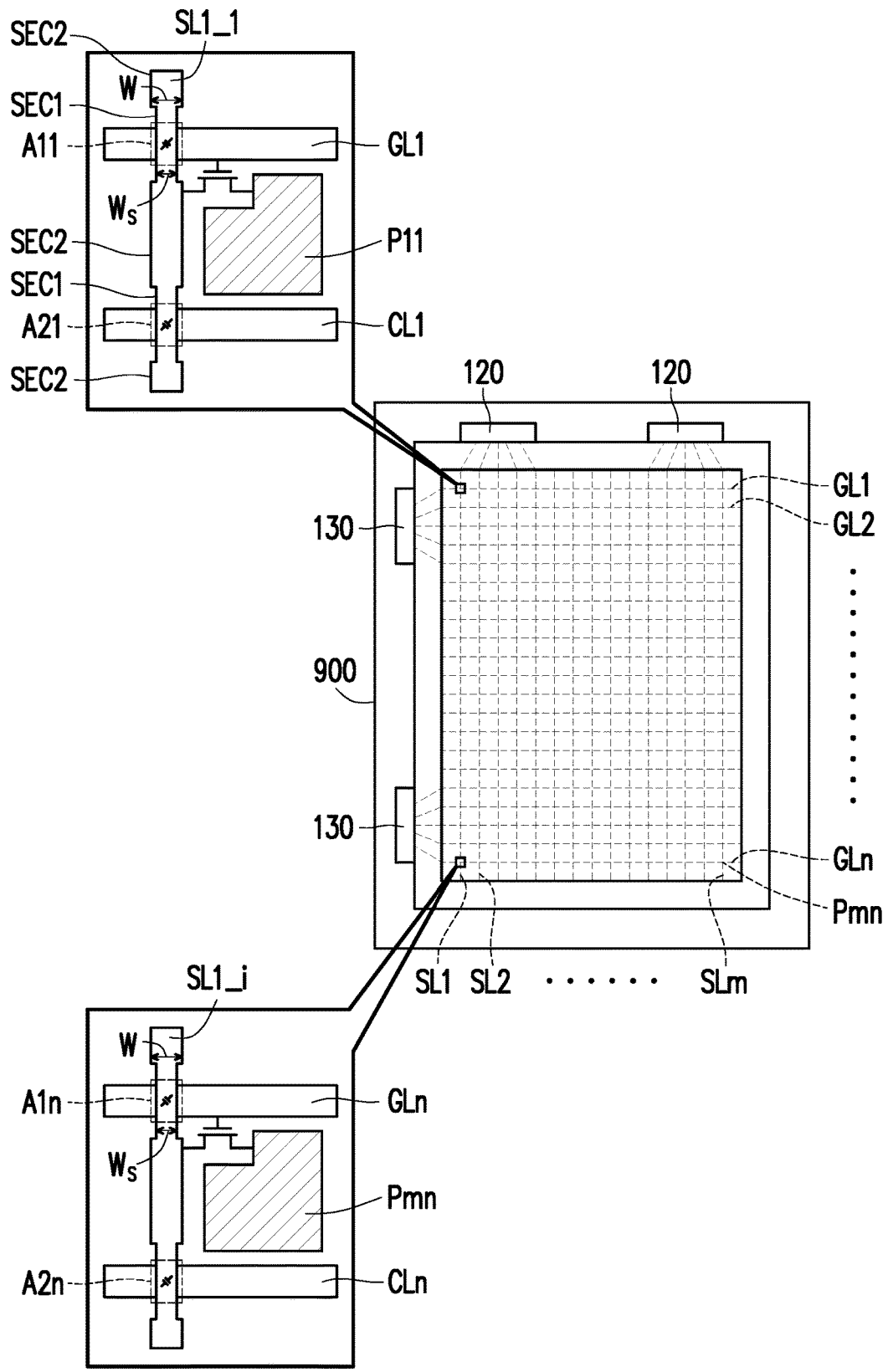
FIG. 9 is a schematic diagram of a display panel according to another embodiment of the present invention.

FIG. 9 is a schematic diagram of a display panel 900 according to another embodiment of the present invention. The embodiment of FIG. 9 is similar to the embodiment of FIG. 8. Therefore, identical or similar elements are denoted by the same or similar reference numerals, which will not be described again hereinafter.

What differs from FIG. 8 is, in FIG. 9 the intersecting part SEC1 has a line width $W_S$ smaller than the fixed width of source lines in a conventional display panel 50, by reducing the line width of the intersecting part SEC1 to be smaller, such that the parasitic capacitance between the source line and the gate line or between the source line and the common electrode line is reduced and smaller than the parasitic capacitance in the conventional display panel 50. The non-intersecting part SEC2 has a line width W larger than $W_S$, and W may be similar to the fixed width of source lines in the conventional display panel 50. Considering both the intersecting part SEC1 and the non-intersecting part SEC2, the equivalent resistance may be slightly increased due to smaller width $W_S$. Based on the reduced parasitic capacitance and the equivalent resistance slightly increased, the RC time constant can also be reduced compared to the conventional RC time constant. Thus, the time constant at far-end portion of the source line is also reduced.

Based on FIG. 8 and FIG. 9, in another embodiment, both the reduced parasitic capacitance and the reduced equivalent resistance may be realized in each portion by reducing the line width of the intersecting part SEC1 and also increasing the line width of the non-intersecting part SEC2. In still another embedment, not only the line width of the source lines but also the line width of the gate lines and the line width of the common electrodes lines are also reduced at the overlapped areas so that the parasitic capacitance may be further reduced.

Furthermore, as an additional feature on the above embodiments related to altering line width, the parasitic capacitances between the source lines and the gate lines (or common electrode lines) are gradually reduced from the near-end portion of the source line close to the source driving chip to the far-end portion of the source line far from the source driving chip, by altering the distance between the source line and the gate lines to form difference distances at different portions of the source line, i.e., altering the distance between a layer of the source lines and a layer of the gate lines. The distance between the near-end portion of the source line and the associated gate lines is smaller than the distance between the far-end portion of the source line and associated gate lines. The material between the source lines and the gate lines are an insulating material, and this embodiment means that the thickness of the insulating material between the source lines and the gate lines is gradually increased from the near-end portion toward the far-end portion of the source line. As a result, the parasitic capacitance between the far-end portion of the source line and the gate lines is smaller than the parasitic capacitance between the near-end portion of the source line and the gate lines. The smaller parasitic capacitance helps reduce the RC timing constant at the far-end portion of the source line.

In the above embodiments as illustrated in FIG. 1 to FIG. 9, the reduced RC time constant is achieved by altering the line width of the source lines that affects the equivalent resistances and/or parasitic capacitances.

Figure 10:
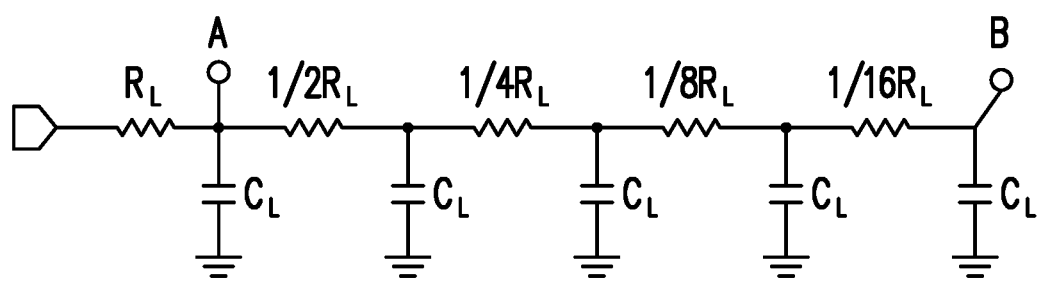
FIG. 10 illustrates the equivalent circuit schematic of a display panel according to another embodiment of the present invention.

In other embodiments, altering the equivalent resistance may be realized by altering the line thickness of the source lines SL1-SLm to achieve reducing RC time constant. In one embodiment, the thickness of the source line is gradually increased from an end portion of the source line close to a source driving chip toward the other end portion of the source line far from the source driving chip. The thickness of the source line and the equivalent resistance can be expressed as following equations:

$$T_{(j+1)}=2*T_j, j=1, 2, 3 \ldots (i-2), (i-1) \qquad \text{Eq(3)};$$

$$R_{(j+1)}=(1/2)R_j, j=1, 2, 3 \ldots (i-2), (i-1) \qquad \text{Eq(4)};$$

wherein $T_j$ is the thickness, $R_j$ is the equivalent resistance, the integer j increases from an end portion close to the source driving chip toward the other end portion, i is the number of stages of line thickness, and the coefficient 2 in Eq(3) is based on that the thickness of the source line in a current stage is a double of the thickness in a preceding stage. The coefficient is determined by the manufacture process of the display panel. In this example, the equivalent resistance of a portion of the source line in the current stage is a double of the equivalent resistance of another portion in a preceding stage. FIG. 10 illustrates an equivalent circuit schematic of a display panel with different thickness of the source lines. In FIG. 10, 5-stages thickness is taken as an example, and the equivalent resistances of the five portions of the source line are from $R_L$ to $(1/16)R_L$ based on Eq(4), while the parasitic capacitances with respect to these portions are the same since the line width of the source line is fixed. In the present embodiment, the time constant of the B point (as the far-end portion) can be derived and approximate to $8.0625*R_L*C_L$, which is $R_L*C_L+(3/2)R_L*C_L+(7/4)R_L*C_L+(15/8)R_L*C_L+(31/16)R_L*C_L$, and this is a significantly reduced value about a half of the time constant of the point B in the conventional display panel 50 illustrated in FIG. 2 which is 15 $R_L*C_L$. In another embodiment, even though a few portions of the source line do not follow the tendency of gradually increased thickness, RC time constants with respect to the portions far from the source driving chip can be still reduced.

Figure 11:
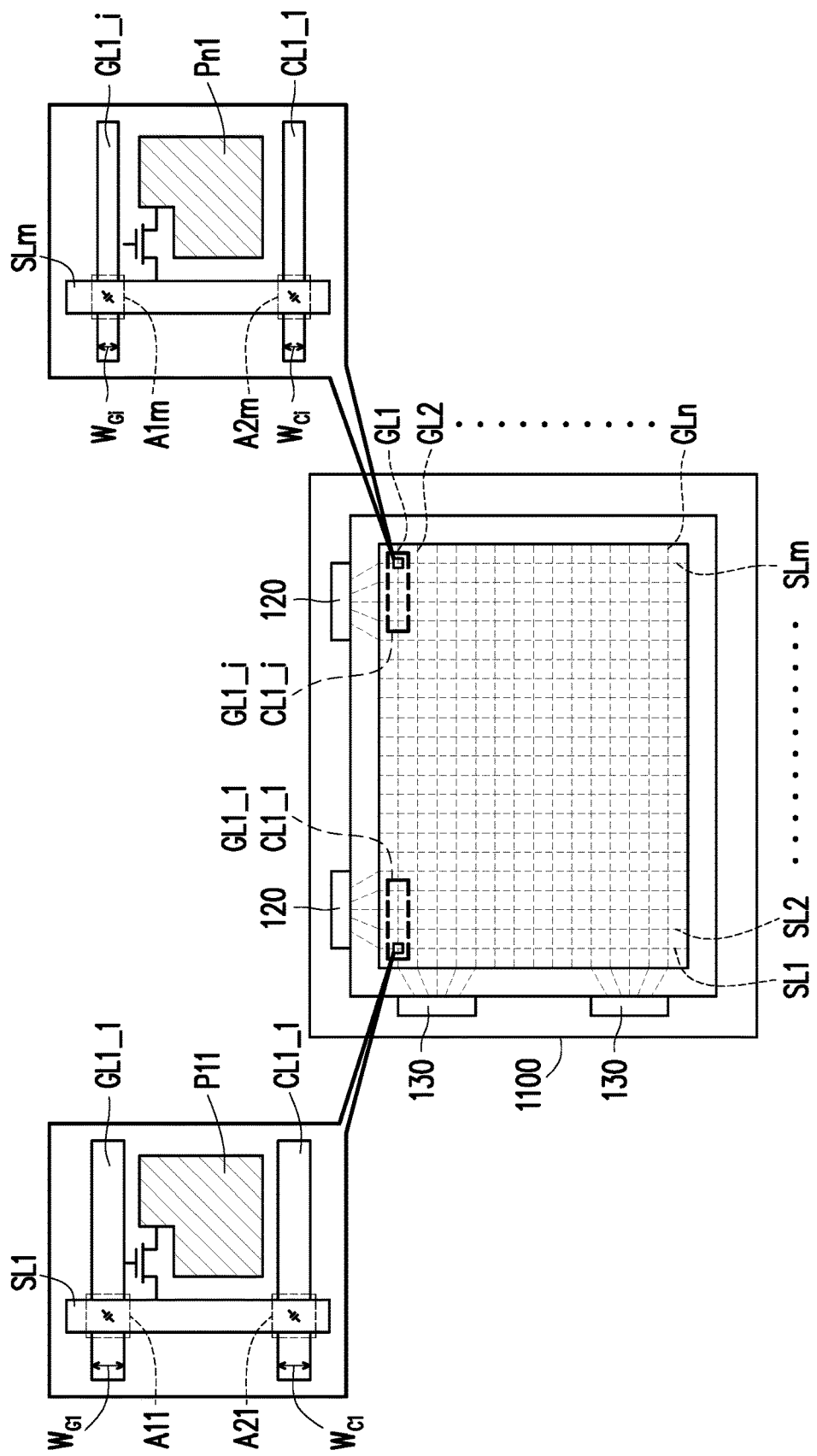
FIG. 11 is a schematic diagram of a display panel according to another embodiment of the present invention.

FIG. 11 is a schematic diagram of a display panel 1100 according to another embodiment of the present invention.

In the present embodiment, the embodiment of FIG. 11 is similar to the embodiment of FIG. 3. Therefore, identical or similar elements are denoted by the same or similar reference numerals, which will not be described again hereinafter. What the present embodiment of FIG. 11 is different from the above-mentioned embodiments is that the parasitic capacitance between the metal lines can be reduced through altering the line widths of the gate lines GL1-GLn and the common electrode lines CL1-CLn while fixing the line widths of the source lines SL1-SLm, so to achieve the effects of minimizing the difference between RC time constants at different positions of the gate lines and the common electrode lines. As shown in FIG. 11, the near-end portion GL1_1 of the gate lines GL1 and the near-end portion CL1_1 of the common electrode lines CL1 close to the gate driving chips 130 are respectively intersected with the source line SL1 to have the first and second overlapped areas A11, A21, and the far-end portion GL1_i of the gate lines GL1 and the far-end portion CL1_i of the common electrode lines CL1 far away from the gate driving chips 130 are respectively intersected with the source lines SLm to have the first and second overlapped areas A1m and A2m. In the present embodiment of FIG. 11, the line widths $W_{G1}$ and $W_{C1}$ of the near-end portions GL1_1 and CL1_1 may be the same as the line width of the gate lines and the line width of the common electrode lines of a conventional display panel 50, and the line widths of the gate lines GL1 and the line widths of the common electrode lines CL1 may be gradually reduced from the near-end portions toward the far-end portions, by multiple stages, so that the near-end portions GL1_1 and CL1_1 of the gate line GL1 and the common electrode line CL1 passing through the first and second overlapped areas A11, A21 may respectively have larger line widths $W_{G1}$ and $W_{C1}$ as the first stage, and far-end portions GL1_i and CL1_i of the gate line GL1 and the common electrode line CL1 passing through the first and second overlapped areas A1m, A2m respectively have smaller line widths $W_{Gi}$ and $W_{Ci}$ as the i-th stage. The configuration of the different line widths of the gate lines and the common electrode lines in the present embodiment can achieve the same effect as mentioned in the embodiment in FIG. 3. The equivalent circuit diagram for the different line widths of the gate lines and the common electrode lines is the same as the illustrated in FIG. 4 and is omitted herein. Namely, the charging time constant at different portions of the gate lines and the common electrode lines of the display panel 1100 can be reduced.

Figure 12:
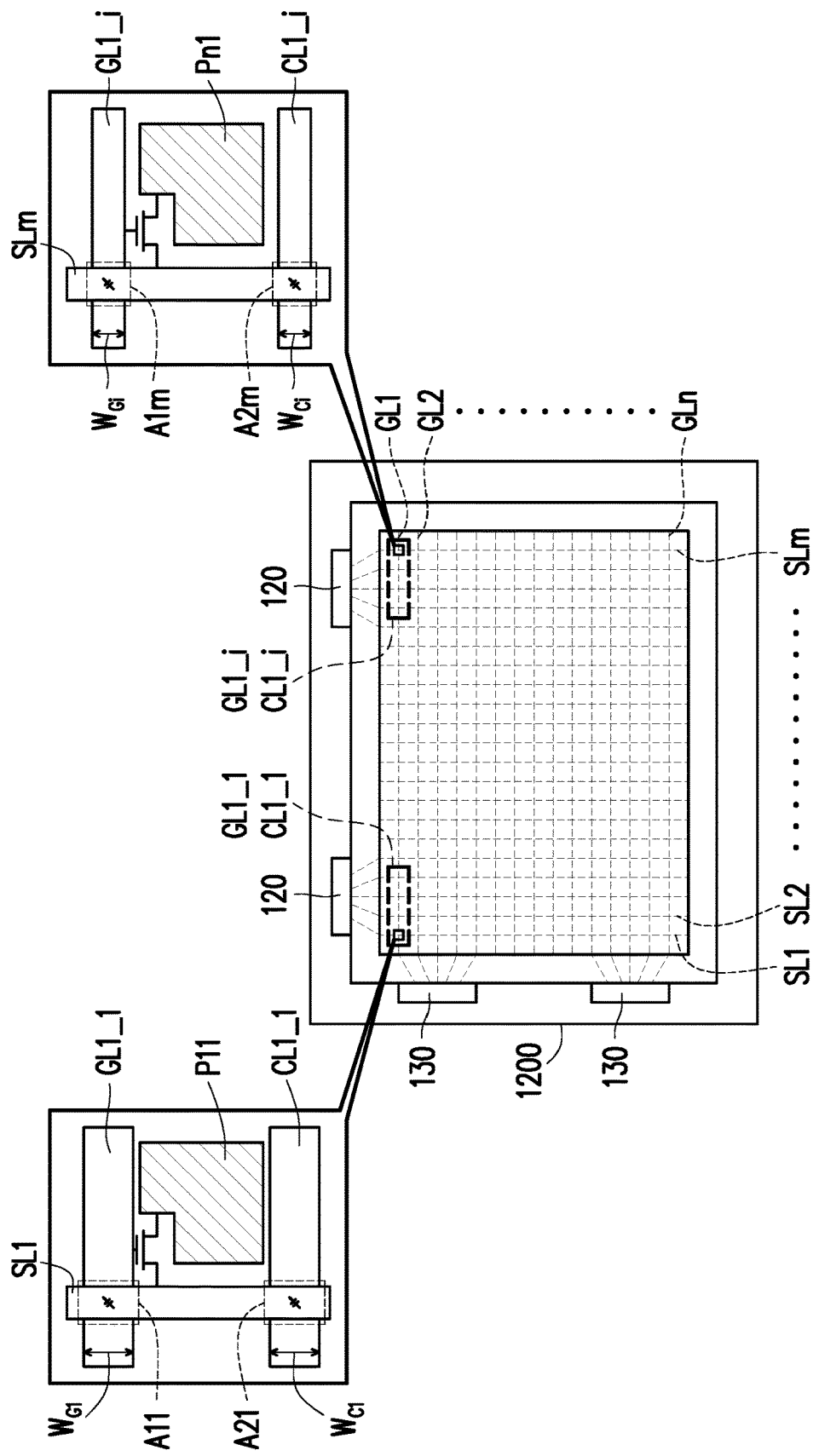
FIG. 12 is a schematic diagram of a display panel according to another embodiment of the present invention.

FIG. 12 is a schematic diagram of a display panel 1200 according to another embodiment of the present invention. In the present embodiment, the embodiment of FIG. 12 is similar to the embodiment of FIG. 11. Therefore, identical or similar elements are denoted by the same or similar reference numerals, which will not be described again hereinafter. The difference between the embodiments of FIG. 12 and FIG. 11 is that the line widths of the electrode gate lines GL1-GLn and the common electrode lines CL1-CLn of the FIG. 12 are increased from the end portion far away from the gate driving chips 130 toward the gate driving chips 130 through multiple stages (e.g., 5 stages). In the present embodiment of FIG. 12, the line width $W_{Gi}$ of the far-end portion GL1_i and the line width $W_{Ci}$ of the far-end portions CL1_i may be the same as the line width of the gate lines and common electrode lines of a conventional display panel 50. The near-end portions GL1_1 and CL1_1 of the gate line GL1 and the common electrode line CL1 passing through the first and second overlapped areas A11 and A21 respectively have larger line widths $W_{G1}$ and $W_{C1}$, and the far-end portions GL1_i and CL1_i of the gate line GL1 and the common electrode line CL1 passing through the first and second overlapped areas A1m and A2m respectively have smaller line widths $W_{Gi}$ and $W_{Ci}$. Take 5-stages line widths as an example, the line width $W_{G5}$ is the one-sixteen of the line width $W_{G1}$, and the line width $W_{C5}$ is the one-sixteen of the line width $W_{C1}$. Nevertheless, the configuration of the line widths of the gate line GL1 and the common electrode line CL1 is merely taken as example for explanation. In another embodiment not illustrated in drawings, the configuration of the line widths of the gate line GL1 and the common electrode line CL1 can be modulated according to the practical needs.

In another embodiment, the line width of the gate lines or the common electrode line may be altered at the intersecting part or at non-intersecting part, similar to the configuration of the line widths of the source line shown in FIG. 8 or FIG. 9. In addition, in another embodiment, the line thickness of the gate lines or the common electrode lines may be altered and have an equivalent circuit similar to FIG. 10.

Based on the above, in the present invention, the line widths or the line thickness of metal lines such as the source lines, the gate lines and the common electrode lines are altered to adjust the equivalent resistance of the metal lines in different areas of the display panel and/or the parasitic capacitance between the metal lines. Through the alteration of the aforementioned equivalent resistance of the metal lines and/or the parasitic capacitance between the metal lines, time constants at the portion of the metal lines far from the source/gate driving chip can be reduced so as to minimize the difference of time constants in the different areas of the display panels can be reduced. Therefore, the problems of insufficient charging time for those pixel units far away from the source and gate driving chips can be alleviated, so as to enhance the display quality of the large size display panels.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A display panel, comprising:
   a pixel array;
   a plurality of first lines, wherein each of the first lines is coupled to a first plurality of pixel units in the pixel array along a first direction;
   a plurality of second lines, wherein each of the second lines is coupled to a second plurality of pixel units in the pixel array along a second direction different from the first direction;
   wherein at least one conductive line of the first lines and the second lines comprises a first portion, a second portion and a third portion along an extension direction of the conductive line, the first portion is relatively close to an end of the conductive line, the third portion is relatively close to the other end of the conductive line, the second portion is in between the first portion and the third portion,
   each of the first portion, the second portion and the third portion comprises an intersecting part that is intersecting with another conductive line of the first lines and the second lines,
   a line width of the intersecting part of the first portion is larger than a line width of the intersecting part of the second portion, and the line width of the intersecting part of the second portion is larger than a line width of the intersecting part of the third portion.

2. The display panel of claim 1, wherein the first lines are source lines and the second lines are gate lines.

3. The display panel of claim 2, wherein the conductive line is one of the source lines and the another conductive line is one of the gate lines.

4. The display panel of claim 2, wherein the conductive line is one of the gate lines and the another conductive line is one of the source lines.

5. The display panel of claim 1, wherein the first lines are source lines and the second lines are common electrode lines.

6. The display panel of claim 5, wherein the conductive line is one of the source lines and the another conductive line is one of the common electrode lines.

7. The display panel of claim 5, wherein the conductive line is one of the common electrode lines and the another conductive line is one of the source lines.

8. A display panel, comprising:
a pixel array;
a plurality of first lines, wherein each of the first lines is coupled to a first plurality of pixel units in the pixel array along a first direction;
a plurality of second lines, wherein each of the second lines is coupled to a second plurality of pixel units in the pixel array along a second direction different from the first direction;
wherein at least one conductive line of the first lines and the second lines comprises a first portion, a second portion and a third portion along an extension direction of the conductive line, the first portion is relatively close to an end of the conductive line, the third portion is relatively close to the other end of the conductive line, the second portion is in between the first portion and the third portion,
each of the first portion, the second portion and the third portion comprises an intersecting part that is intersecting with another conductive line to respectively form a first capacitor, a second capacitor and a third capacitor,
a capacitance of the first capacitor is larger than a capacitance of the second capacitor, and the capacitance of the second capacitor is larger than a capacitance of the third capacitor.

9. The display panel of claim 8, wherein the first lines are source lines the second lines are gate lines.

10. The display panel of claim 9, wherein the conductive line is one of the source lines and the another conductive line is one of the gate lines.

11. The display panel of claim 9, wherein the conductive line is one of the gate lines and the another conductive line is one of the source lines.

12. The display panel of claim 8, wherein the first lines are source lines and the second lines are common electrode lines.

13. The display panel of claim 12, wherein the conductive line is one of the source lines and the another conductive line is one of the common electrode lines.

14. The display panel of claim 12, wherein the conductive line is one of the common electrode lines and the another conductive line is one of the source lines.

* * * * *